United States Patent
Chakraborty et al.

(10) Patent No.: US 11,795,401 B2
(45) Date of Patent: Oct. 24, 2023

(54) CONVERSION OF WASTE PLASTICS TO PETROCHEMICALS

(71) Applicants: LUMMUS TECHNOLOGY LLC, Houston, TX (US); Karen G Combs

(72) Inventors: Sudipto Chakraborty, Houston, TX (US); Daniel T. Fernald, Houston, TX (US); David Lee Guymon, Houston, TX (US); Ron Herbanek, Houston, TX (US); Richard John Jibb, Houton, TX (US); Johnny Doyle Combs, Tyler, TX (US); Boddie Lynn Lindsey, Kilgore, TX (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 0 days.

(21) Appl. No.: 17/648,073

(22) Filed: Jan. 14, 2022

(65) Prior Publication Data
US 2022/0228070 A1   Jul. 21, 2022

Related U.S. Application Data

(60) Provisional application No. 63/138,233, filed on Jan. 15, 2021.

(51) Int. Cl.
*C10G 1/10* (2006.01)
*C10G 1/00* (2006.01)
(Continued)

(52) U.S. Cl.
CPC ............... *C10G 1/10* (2013.01); *B09B 3/40* (2022.01); *B09B 3/70* (2022.01); *C10B 31/06* (2013.01);
(Continued)

(58) Field of Classification Search
None
See application file for complete search history.

(56) References Cited

U.S. PATENT DOCUMENTS 3,984,288 A * 10/1976 Yoshida ................. C10B 53/07
  48/209
5,731,483 A   3/1998 Stabel et al.
(Continued)

FOREIGN PATENT DOCUMENTS

CN   109563411 A      4/2019
JP    11106758 A *    4/1999
(Continued)

OTHER PUBLICATIONS

Machine translation JP 11-106758. retrieved Sep. 26, 2022 (Year: 2022).*
(Continued)

*Primary Examiner* — In Suk C Bullock
*Assistant Examiner* — Alyssa L Cepluch
(74) *Attorney, Agent, or Firm* — Osha Bergman Watanabe & Burton LLP (57) ABSTRACT

Process and systems for converting waste plastics include feeding a waste plastic to a melt tank, and in the melt tank, heating the waste plastic to form a molten plastic. The molten plastic is withdrawn from the melt tank and fed to a pyrolysis reactor. In the pyrolysis reactor, the molten plastic is heated to a pyrolysis temperature, producing a pyrolysis oil product and a liquid pitch product. The pyrolysis oil is then separated into a pyrolysis gas fraction, a light pyrolysis oil fraction, a medium pyrolysis oil fraction, and a heavy pyrolysis oil fraction.

18 Claims, 3 Drawing Sheets

(51) Int. Cl.
*B09B 3/40* (2022.01)
*C10B 53/07* (2006.01)
*C10B 31/06* (2006.01)
*B09B 3/70* (2022.01)
*B09B 101/75* (2022.01)

(52) U.S. Cl.
CPC .............. *C10B 53/07* (2013.01); *C10G 1/002* (2013.01); *B09B 2101/75* (2022.01); *C10G 2300/1003* (2013.01)

(56) References Cited

U.S. PATENT DOCUMENTS

| | | | |
|---|---|---|---|
| 6,534,689 | B1 | 3/2003 | Stankevitch |
| 2003/0199718 | A1* | 10/2003 | Miller .................... C10G 1/002 208/18 |
| 2012/0261247 | A1* | 10/2012 | McNamara ............... F23G 5/02 201/25 |
| 2015/0080624 | A1 | 3/2015 | Gephart et al. |
| 2018/0010050 | A1* | 1/2018 | Van Der Ree ........... C10G 9/00 |

FOREIGN PATENT DOCUMENTS

| WO | 2011077419 A1 | 6/2011 |
|---|---|---|
| WO | 2018000050 A1 | 1/2018 |

OTHER PUBLICATIONS

International Search Report Issued in Application No. PCT/US2022/012544, dated May 4, 2022, 3 pages.
Written Opinion Issued in Application No. PCT/US2022/012544, dated May 4, 2022, 5 pages.
Office Action issued in Taiwanese Application No. 111101735, dated Jul. 5, 2023 (2 pages).

* cited by examiner

CONVERSION OF WASTE PLASTICS TO PETROCHEMICALS

FIELD OF THE DISCLOSURE

Embodiments of the present disclosure generally relate to the conversion of waste plastics to petrochemicals, fuels, and other useful intermediates and products.

BACKGROUND

There has been a rapid and growing environmental concern regarding the need to recover and recycle plastic wastes. Plastic pyrolysis technology, however, is at an early stage of development in the industry.

SUMMARY

Embodiments herein relate to thermochemical processes and systems useful to convert waste plastics to petrochemicals, fuels, and other intermediates or end products.

In one aspect, embodiments herein relate to a process for converting waste plastics. The process includes feeding a waste plastic to a melt tank, and in the melt tank, heating the waste plastic to form a molten plastic. The molten plastic is withdrawn from the melt tank and fed to a pyrolysis reactor. In the pyrolysis reactor, the molten plastic is heated to a pyrolysis temperature, producing a pyrolysis oil product and a liquid pitch product. The pyrolysis oil is then separated into a pyrolysis gas fraction, a light pyrolysis oil fraction, a medium pyrolysis oil fraction, and a heavy pyrolysis oil fraction.

In another aspect, embodiments herein are directed toward a system for pyrolyzing a waste plastic. The system includes a melt tank having an inlet configured for receiving a feed stream comprising waste plastic from a waste plastic feed system. The melt tank also includes a heating system configured for heating the waste plastic from a feed temperature to a melt temperature, producing a molten plastic, as well as an outlet configured for outputting the molten plastic. The system for pyrolyzing a waste plastic also includes a pyrolysis reactor having an inlet configured to receive the molten plastic, and a heating system configured to heat the molten plastic to a pyrolysis temperature, as well as a first outlet for recovering a pyrolysis oil. The pyrolysis reactor further includes a second outlet for recovering a pitch product. The system further includes a control system configured to control the heating system to limit a temperature of the molten plastic to a temperature for production of the pitch product (and below that at which significant char or coke will form).

DETAILED DESCRIPTION

Embodiments herein are directed toward thermochemical processes to convert waste plastics to useful petrochemicals, fuels, and other intermediates or end products. Embodiments herein are also directed toward pyrolysis reactor design and control.

Polymers that may by pyrolyzed to form a waste plastic pyrolysis oil may include thermoplastics, thermosets, and elastomers. For example, waste material undergoing pyrolysis to form a waste plastic pyrolysis oil may include polystyrene, polypropylene, polyphenylene sulfide, polyphenylene oxide, polyethylene, polyetherimide, polyether ether ketone, polyoxymethylene, polyether sulfone, polycarbonate, polybenzimidazole, polylactic acid, nylon, and acrylic polymers such as poly methyl methacrylic acid (PMMA), among many other thermoplastics. Waste plastic pyrolysis oils useful herein may also be formed from various unsaturated or saturated elastomers and rubbers known in the art, such as polybutadiene, isoprene, styrene-butadiene, ethylene vinyl acetate, and many, many others. Embodiments herein may be robust enough to process some quantity of heteroatom-containing polymers, including those listed above as well as others known in the art; however, a heteroatom content of the resulting waste plastic pyrolysis oil should typically be less than 2 wt %, such as less than 1 wt % or less than 0.5 wt %.

The waste plastic may be converted to a pyrolysis oil using systems according to embodiments herein. The systems may include, as primary components, a melt tank and a pyrolysis reactor. The system may also include a waste plastic feed system, a pyrolysis oil separation system, and one or more heating systems, as will be described below.

In general, the waste plastic feed system is a system configured to provide a waste plastic feed to the melt tank, and is not particularly limited, as many different configurations may be used. In some embodiments, a waste plastic feed system may include a feed hopper, which may be filled with a quantity of waste plastic, such as in the form of chips, pellets, flakes, attenuated fibers, shredded plastic, and other forms of waste plastic as may be received from a recycler or other supplier of waste plastics. The feed hopper may be fluidly connected to a screw conveyor or other means for metering and conveying the waste plastic to the melt tank. In some embodiments, the waste plastic feed system may include an extruder, which may be a single or double screw type, and may heat and partially or fully melt the waste plastic by viscous dissipation of the mechanical energy supplied by a motor to a rotating screw.

In general, it is desired to limit the amount of water and oxygen fed to the melt tank and the pyrolysis reactor. The screw conveyor and/or the feed hopper or associated flow lines may be connected to a hot nitrogen supply system, such that the polymer may be heated to a temperature sufficient to remove water, but not so high as to melt the polymers, venting a nitrogen stream containing water vapor and any oxygen as may be displaced.

The dried waste plastic may then be fed to the melt tank, wherein the waste plastic is heated to a temperature sufficient to melt the plastic but low enough so as to avoid any significant conversion of the waste plastic, as it is preferred to control the reaction and resulting reaction products via conversion in the pyrolysis reactor. In some embodiments the waste plastic may be heated in an extruder and may be fed to the melt tank in a heated, partially molten or fully molten condition. The waste plastic may then be heated, or further heated, in the melt tank to a temperature in the range from about 200° C. to about 375° C., such as about 300° C. The temperature of the molten plastic should be high enough to melt the plastic and provide a molten plastic of a desired viscosity, facilitating transport between unit operations, but, as noted above, low enough to limit or avoid conversion of the plastics within the melt tank.

The melt tank may be an agitated vessel. The vessel may include an inlet for receiving a feed stream comprising waste plastic from the waste plastic feed system, as well as an outlet for conveying or outputting the resulting molten plastic. The melt tank may also include a vapor outlet for venting any gasses produced in the melt tank or expelled from the waste plastic, such as may be entrained with the feed or resulting from the heating of the waste plastics. The melt tank vessel may include a heating system for heating the waste plastic from a feed temperature to a melt temperature. The heating system may include one or both of an external jacket and internal coils to provide heat for melting the waste plastic.

Following melting of the waste plastic, the molten plastic may be fed to a pyrolysis reactor for converting the molten plastic into a pyrolysis oil product and a pitch product. The pyrolysis reactor may include an inlet configured to receive the molten plastic, a first outlet for recovering the pyrolysis oil, and a second outlet for recovering the pitch product. The pyrolysis reactor may also include a heating system configured to heat the molten plastic from the inlet temperature to a pyrolysis temperature. The molten plastic may be heated within the pyrolysis reactor up to a temperature, for example, in the range from about 350° C. to about 700° C., such as from about 370° C. (700° F.) to about 675° C. (1250° F.), such as from 350° C. (662° F.) to 550° C. (1022° F.), and at a pressure in the range from about 0.3 barg (4 psig) to about 1.4 barg (20 psig), such as about 0.4 barg (6 psig).

Associated with the heating, the molten plastic may be broken down into short-chain petroleum hydrocarbons that can be recovered and separated in the separation system. Desirably, embodiments herein produce a pitch product, and thus limit the amount of coke or char formed by pyrolysis of the plastics. Heating of the molten plastic within the pyrolysis reactor may be limited or controlled such that less than 1 wt % of the waste plastic is converted to coke or char in some embodiments; less than 0.5 wt % in other embodiments; and less than 0.2 wt % in yet other embodiments. Limiting char formation may provide for extremely long reactor run lengths as well as production of a more valuable pitch product. A control system may be provided to control the pyrolysis reactor heating system, providing a heating profile or heating temperature preferential to the production of the pitch product and below a temperature at which any significant char or coke will form.

In some embodiments, the pyrolysis reactor heating system may include a pre-heat zone and a reaction zone. The pre-heat zone may be configured to heat the molten plastic up to a first pyrolysis temperature, targeting a low conversion, such as 5-20 wt % conversion, for example 10 wt % conversion (conversions herein are wt % unless otherwise noted). Following the pre-heat zone, the molten plastic may be processed in the reaction section to convert a significant portion of the plastic to pyrolysis oil. The pyrolysis temperature and residence time may target a reaction zone conversion in the range from 30 wt % to 80 wt % conversion, such as 70 wt % conversion. Overall conversion of the waste plastics to pyrolysis gas and pyrolysis oil may be, for example, greater than 80 wt %, greater than 85 wt %, greater than 90 wt %, and up to 95 wt % or 97 wt % in some embodiments, where the remainder of the waste plastic may be recovered from the pyrolysis reactor as a pitch product.

The pyrolysis oil recovered from the pyrolysis reactor may be fed to a separation system for separating the pyrolysis reaction effluent into two or more fractions. The separation system may include one or more distillation columns. A pre-flash tank may also be provided to separate the pyrolysis reactor effluent into a liquid feed and a vapor feed fed to the distillation column(s). In some embodiments, the pyrolysis reaction products recovered from the pyrolysis reactor may be separated, based on boiling points, into a pyrolysis gas fraction, a light pyrolysis oil fraction, a medium pyrolysis oil fraction and a heavy pyrolysis oil fraction.

To facilitate mixing and melting of the polymer, embodiments herein may include a flow splitter, disposed intermediate the melt tank outlet and the pyrolysis reactor inlet, configured to divide the molten plastic into a first portion and a second portion. The first portion may be fed to the pyrolysis reactor inlet. The second portion may be fed to a mixing system configured to mix the second portion of the molten plastic with the waste plastic. The mixing system may be configured as a part of the waste plastic feed system, such as by mixing the waste plastic solids with the molten plastic in a screw conveyer; in other embodiments, the mixing system may be disposed upstream of the melt tank inlet and downstream of the waste plastic feed system.

In some embodiments, intermediate recovery from the pyrolysis reactor and the separation system, the pyrolysis reaction effluent may be quenched. For example, in some embodiments, the medium pyrolysis oil or the heavy pyrolysis oil may be used as a quench medium, lowering the temperature of the pyrolysis reactor effluent and slowing or halting any reactions that may otherwise occur during transport to the separation system. In this manner, over-cracking of the plastics and excessive production of pyrolysis gas may be avoided, providing for a higher liquid pyrolysis oil recovery. Systems herein may thus include a flow splitter (which may be a simple tee or pipes/valving) for dividing the medium or heavy pyrolysis oils into a first and second portions, as well as a quench system for mixing one of the portions with the pyrolysis reaction products recovered from the pyrolysis reactor.

Furthering the transportability of the molten plastic recovered from the melt tank, processes herein may include mixing the molten plastic with a portion of the heavy or medium pyrolysis oil. For example, the heavy pyrolysis oil may be divided using a flow splitter, and a portion of the heavy pyrolysis oil may be recycled as a diluent and mixed with the molten plastic in a mixing system (which may be a flow tee, static mixer, or small agitated vessel, for example). In other embodiments, for example, the medium pyrolysis oil may be divided using a flow splitter, and a portion of the medium pyrolysis oil may be recycled as a diluent and mixed with the molten plastic in a mixing system. The mixing system may be disposed downstream of the melt tank and upstream of the pyrolysis reactor. In some embodiments, the mixing system is disposed intermediate the melt tank and the molten plastic flow splitter.

In some embodiments, a heat exchanger is also provided on the flow line transporting molten plastic from the melt tank to the pyrolysis reactor. The heat exchanger may be configured to heat or maintain a temperature of the molten plastic, to maintain flowability to the downstream systems. Heating may also be required following admixture with a recycled medium or heavy pyrolysis heating to maintain the molten plastic at a desired temperature.

As outlined above, systems herein may include a melt tank having a heating jacket and heating coils, a nitrogen heater, and a molten plastic heat exchanger. Heat may be provided to each of these using a heat exchange medium. The heat exchange medium may be heated, for example, using a fired or electrical heating system. Fuel may be supplied to the fired heating system, and may be an external fuel supply, or may be an internal fuel supply, such as the pyrolysis gas recovered from the separation system. The heat exchange medium may be provided via a closed-loop system, the heat exchange medium being circulated from the fired heater, to each respective user at a desired rate, and then back to the fired heater for continued heating, circulation, and use.

For systems processing chlorine- and other halogen-containing polymers, such as PVC, embodiments herein may include a chemical injection system for providing reagents that will react with and facilitate removal of the halogens. Inorganic and organic chloride and other halides (fluorides, bromides) are regularly present in all types of plastics, typically but not limited to being present as additives, binders, flame retardants, and residual catalysts. These halides get partly removed by dissociating in the melt tank to form hydrogen chloride or fluoride or bromide, recovered as vent gases from the melt tank or from a melt vapor separator and treated using a chloride removal system. The remaining halogens may be removed using in-situ alkaline chemical injection. The chemical injection may be into the polymer melt, such as upstream of or directly into the pyrolysis reactor. The alkaline chemical, which is typically but not limited to anhydrous lime, caustic soda, aluminum oxide, calcium carbonate, or magnesium oxide, is used for this purpose. For example, a slurry phase solution of the alkaline chemical is prepared and injected into the pyrolysis reactor where temperature ranging from 500° F. to 1000° F. and residence times ranging from 5 min to 60 min are provided to react organic halides with the alkaline chemical to form salts that are thereby removed from the pyrolysis product oil and gas. Generated alkaline salts and unreacted alkaline chemical are extracted from the pyrolysis reactor bottoms along with pitch.

In some embodiments, the alkaline chemical injection system may include a lime feed system for forming a lime slurry. The lime slurry may be formed, for example, by mixing lime with a portion of the heavy or medium pyrolysis oil. The lime slurry may then be fed to a mixing system for mixing the lime slurry with the molten plastic. The lime mixing system may be disposed upstream of the pyrolysis reactor, and in some embodiments is disposed downstream of the molten plastic flow splitter. In the flow lines and the pyrolysis reactor, the lime may react with chlorine contained in the molten plastic, producing calcium chloride, which may be recovered with the pitch product from the pyrolysis reactor. Other alkaline chemical injection reagents may be used in a similar manner.

Figure 1:
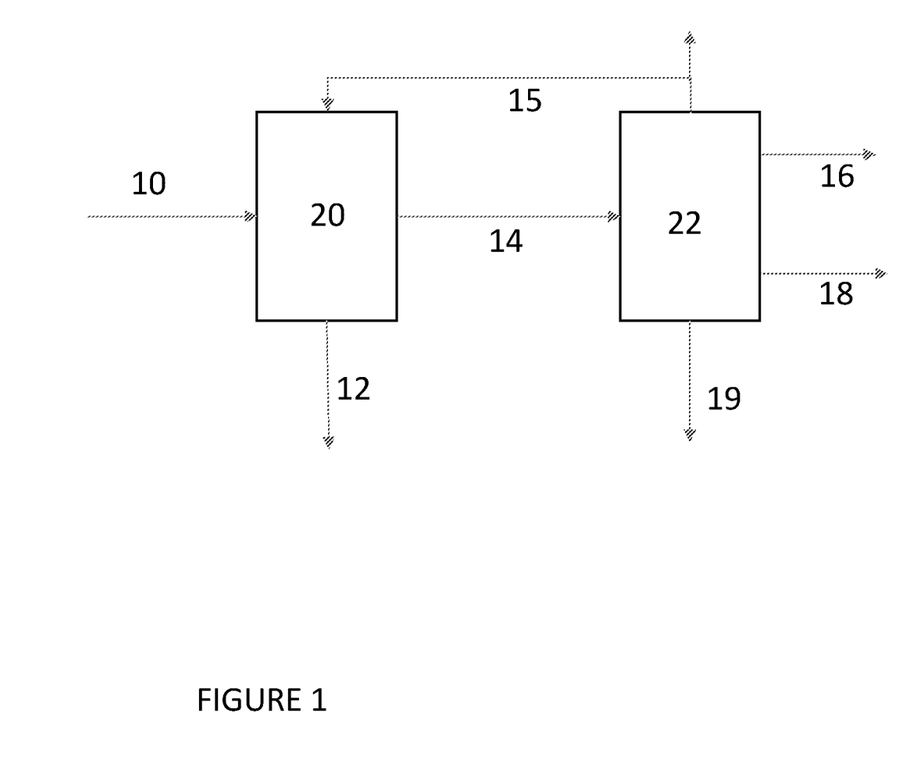
FIG. 1 illustrates a simplified process flow diagram of systems according to one or more embodiments disclosed herein.

A simplified process flow diagram of a thermochemical process according to embodiments herein is illustrated in FIG. 1. A plastic waste feed 10 may be fed to a pyrolysis reaction area 20 for conversion of the plastics to a pyrolysis oil, which may include various hydrocarbons, such as light (C1 to C4) hydrocarbons, naphtha range hydrocarbons, diesel range hydrocarbons, and heavier hydrocarbons, possibly up to pitch. The pitch may be recovered as a byproduct stream 12, and the remaining conversion products may be recovered as a pyrolysis oil 14. The pyrolysis oil 14 may then be fed to a distillation and separation area 22 for separating the pyrolysis oil into various hydrocarbon fractions, such as the aforementioned light hydrocarbons 15, naphtha 16, diesel 18, and heavy oil fractions 19. A portion or whole of the light hydrocarbons 15, such as C1 or C1-C2 or C1 up to C3, C4, C5, C6, or C7 hydrocarbons, may be recycled to the pyrolysis reaction area 20 for use as a fuel for burners (not illustrated) associated with the reactor and/or heaters (also not illustrated). Heavier products may also be recycled, as or if necessary, to the pyrolysis reaction area 20; for example, the naphtha, diesel, or heavy oil fraction(s) may be fed to the pyrolysis reaction area 20 and used as a diluent stream or a quench stream, as will further described below.

In some embodiments, the process equipment for the pyrolysis unit may be in a modularized form. The process modules may be shippable by truck or rail and may be assembled on site. Modularization allows rigorous quality control to be achieved under factory conditions. Modularization also ensures cost and schedule requirements are more predictable and overruns are minimized.

Embodiments herein rely on thermochemical decomposition (pyrolysis) of plastic feedstocks to produce various grades of gas and liquid products. Solid plastic particles are introduced into a melt tank followed in series by a reactor. Each of these vessels are thermally heated. In the case of the melt tank, heat is provided by a circulating hot thermal fluid stream. The reactor is thermally heated by a series of gas fired burners that provide direct impingement of the burner flue gases against the vessel wall that may be jacketed with a low melting point metal. The metal inside the jacketing melts to provide uniform heating.

The thermal mechanism of the process is essentially non-catalytic and breaks the polymeric bonds in the plastic feedstocks by thermal disruption.

The extent of the thermal decomposition is related to the temperatures of the melt tank and the reactor. In general, the higher the temperature the greater the amount of thermal decomposition of the feedstock plastic and the lower the molecular weight of the products (i.e., the polymer chains are broken up into smaller segments with fewer carbon atoms). The process temperature used therefore is a balancing act between being too high (resulting in a higher gas make and lighter low-viscosity liquid products) and being too low (resulting in a lower gas yield and heavier high-viscosity liquid products).

Changes in the composition of the feedstock plastic will affect the preferred temperature for operating the melt tank and reactor. In particular, increased amounts of PVC and high density PP and PE in the feedstock will require the temperature to be increased. Similarly, increased amounts of low density PP and PE along with reduced quantities of PVC in the feedstock will enable a lower process temperature to be used.

Following melting and pyrolysis, embodiments herein then use fractionation to separate the gas and liquids into the desired product streams. Embodiments herein may provide the following product slate: (i) a combustible pyrolysis gas; (ii) a lighter liquid product with physical and chemical properties similar to untreated wild naphtha or gasoline; (iii) heavier liquid products with physical and chemical properties similar to untreated diesel and heavy oil; and (iv) a heavy liquid pitch product that can be blended with asphaltenes from other refinery processes.

One advantage of embodiments herein is its simplicity and flexibility to handle variations in the plastic feedstock composition and capacity. Further, as embodiments of processes herein do not require the addition of any catalysts or additives, the process requires fairly simple primary process controls (i.e., temperature) to govern the product yields and properties.

If required, process temperatures can be adjusted to reflect changes in the composition of the plastic feedstock. At the same time, the amount of PVC and PET in the plastic feedstock should be minimized. PVC plastic is more difficult to melt and decompose; the decomposition product also releases chlorine gas (which is vented off the melt tank and then removed by contacting with water). Residual chlorine can also end up contaminating the liquid product streams, which is undesirable. PET decomposition tends to release oxygenates into the product streams, which are also undesirable contaminants.

Figure 2:
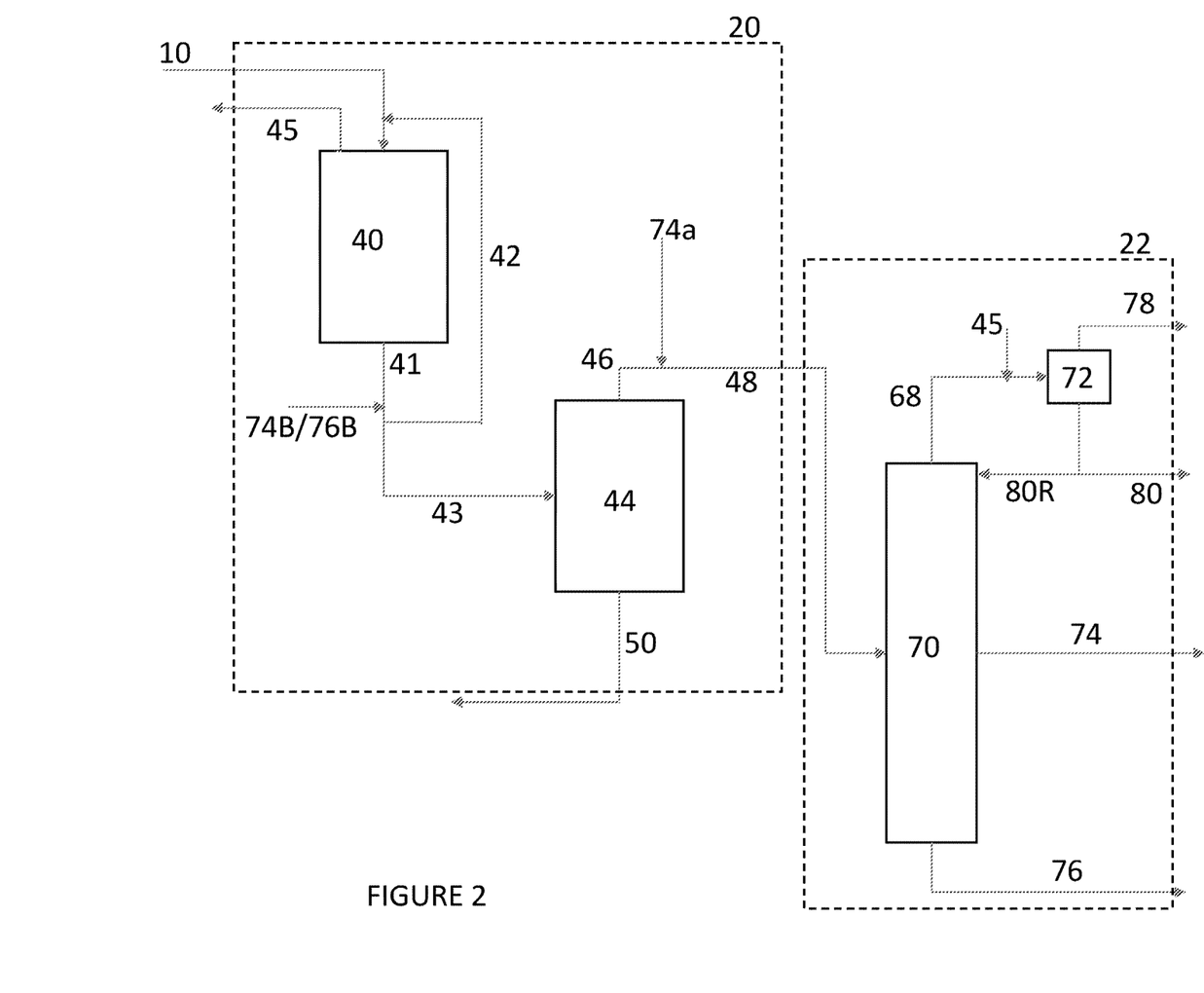
FIG. 2 illustrates a simplified process flow diagram of systems according to one or more embodiments disclosed herein.

Referring now to FIG. 2, a simplified process flow diagram of systems for converting plastic waste according to embodiments herein is illustrated. Shredded plastic 10 may be transferred to the feed area located near the top of the melt tank 40. The plastic is then directed to the melt tank 40 through a feedstock auger (not shown). In some embodiments the feedstock auger may be replaced with or additionally include an extruder, and plastic feedstock may be heated by the action of the extruder. Prior to being fed to the melt tank, the shredded plastic may be combined with a portion of recycled molten plastic 42 from the bottom of the melt tank. The combined plastic feed is then heated within the melt tank, such as to a temperature of 232° C. to 343° C. (450° F. to 650° F.), for example 300° C. (573° F.). The tank may be brought up to temperature by the use of hot thermal fluid circulating through the exterior tank jacket (not shown) as well as the internal coils (not shown) of the melt tank. Alternatively, the tank may be heated by an electrical heating element, or by circulating hot flue gas in a heating jacket The molten plastic may be thoroughly mixed by an internal melt tank agitator (not shown).

In some embodiments, the molten polymer 41 may then be recovered from melt tank 40, pumped, and further heated in a melt heat exchanger (not shown) against hot thermal fluid and fed to a melt vapor separator (not shown). Feed temperature to the separator may be set by controlling the amount of hot thermal fluid to the melt heat exchanger. Any vapors produced in the melt tank may be recovered as an off-gas separated from the molten polymer. In some embodiments, heavy pyrolysis liquid product 76B and/or medium pyrolysis liquid product 74B may be used as a diluent is recycled and added to the molten plastic inside melt tank or at suitable locations upstream of the pyrolysis reactor 44. This diluent also provides heat directly into the plastic melt supplementing the total heat duty required to melt solid plastic. The concentration of recycle diluent is varied to optimize heat input and maintain melt plastic flow.

A first portion 43 of the molten plastic may then be directed to the inlet of the pyrolysis reactor 44, where it may be further heated and pyrolyzed. A second portion 42 of the pumped molten plastic, such as after being heated in the melt heat exchanger, may be recycled back to the melt tank and combined with fresh plastic from the feeding package.

Any vent gases 45 recovered from the melt tank and/or from the melt vapor separator (not shown) may be combined and directed to a chloride removal system. The chloride removal system may include a caustic wash tower or a water wash tower to either completely neutralize the hydrogen chloride or create a byproduct of hydrochloric acid (not illustrated). Chloride may be present in the vent gas stream (s), and it may be removed before combining with the overhead vapor 68 from the separation column 70 to the overhead condenser 72.

The molten plastic 43 may be fed slowly to the feed distributor in the pyrolysis reactor, where molten plastic is heated up on the down-flow internal wall with the assistance of an upper pyrolysis reactor agitator (not shown). In some embodiments, the internal wall may be tapered. As noted above, alkaline reagents may also be introduced to the pyrolysis reactor. The molten plastic may be heated up to a temperature, for example, in the range from about 700° F. to about 1250° F., such as from 662° F. to 1022° F., and at a pressure in the range from about 4 psig to about 20 psig, such as about 6 psig, by hot flue gas, from gas burners, circulating through the exterior jacket. Associated with the heating, the molten plastic may be broken down into short-chain petroleum hydrocarbons that can be separated in the distillation and separation area 22.

The pyrolysis reactor according to embodiments herein may be divided into two zones: a first section and a second section. The first section may contain a preheat zone, targeting a low conversion, such as 5-20% conversion, for example 10% conversion, and a reaction zone targeting 30%-80% conversion, for example 40%-70% conversion, such as about 60% conversion (weight basis). The second section is a liquid product maximization zone, operating at the temperatures noted above, where the final conversion completes with a longer residence time. Temperatures in the second section may be controlled to avoid coking, favoring the production of a liquid pitch product. A lower pyrolysis reactor agitator (not shown) mixes the pitch product and also removes any solids on the wall and bottom of the reactor.

In some embodiments, the separation system may include one or more distillation columns. In some embodiments, the separation system 22 may include a pre-flash drum and one or more distillation columns, among other components. In some embodiments, a pyrolytic vapor product 46 is withdrawn from the pyrolysis reactor 44, where it is quenched in a pyrolysis reactor vapor quench mixer with a portion of the cooled medium pyrolysis cut liquid 74a recovered from the side draw 74 of the separation column 70. The quenched pyrolytic vapor 48 is then sent to a pre-flash drum (not shown) prior to being fed to the separation column 70. To prevent build up, the hot pitch product 50 from the bottom of the reactor is removed and sent to a pitch drum (not shown) via the pyrolysis reactor bottoms auger (not shown). The pitch product from the pyrolysis reactor may be cooled by a slipstream (not shown) of heavy pyrolysis cut liquid from the pre-flash drum (not shown) which in part also reduces the viscosity of the pitch product. The pitch drum may be cooled by ambient air to below about 400° F. but above the softening point.

The quenched pyrolysis products 48 from the overhead of the pyrolysis reactor 44 may be fed to a pre-flash drum (not illustrated) in the distillation and separation area 22. Any heavy pyrolysis cut liquid that drops out from the pre-flash drum may be pumped and combined with separation column 70 bottoms 76. A portion of this heavy pyrolysis cut liquid from the pre-flash drum may also be sent back to the pitch drum (not illustrated) to cool and reduce the viscosity of the pitch product from the pyrolysis reactor, as noted above. The overhead of the flash drum is fed to the separation column as the feed. The separation column may be comprised of valve trays in the top section, a packed bed in the middle section and baffle trays in the bottom section. The primary purpose of the column is to separate the pyrolysis reactor effluent 48 into pyrolysis gas 78, light pyrolysis cut 80, medium pyrolysis cut 74, and a heavy pyrolysis cut 76.

The gross overhead vapor 68 of separation column 70 is combined with treated vent gas stream 45 from the caustic drum (not shown) which are then partially condensed against cooling water in the overhead condenser before it enters the reflux drum 72. The light pyrolysis liquid cut from the reflux drum is then pumped by the light pyrolysis cut pumps where a portion 80R is sent as reflux back to the top of the column. The remaining light pyrolysis product 80 is recovered as a product, and, in some embodiments, antioxidant is injected into this stream. In some embodiments light pyrolysis product may be withdrawn as a side draw from an upper tray of the separation column, and in such embodiments the column may operate at total reflux.

Any light hydrocarbons and non-condensables 78 from the reflux drum 72 are sent to the pyrolysis gas compressor package (not shown) where it is compressed and then cooled. The cooled pyrolysis gas is then sent to the pyrolysis gas accumulator (not shown) where it may be mixed with fuel gas makeup, such as may be required during startup and shutdown. The off-gas from the accumulator is then sent to the thermal fluid package (not shown) and pyrolysis reactor burners (not shown) to be used as a fuel gas.

The medium pyrolysis cut product is withdrawn as a side draw 74 from the middle section of the separation column 70. The medium pyrolysis product 74 is then pumped where a portion 74a is recycled back to the separation column to wash the vapor feed prior to being cooled. A medium pyrolysis cut cooler (not illustrated) may cool the remaining balance, and a portion of the remaining balance may be recycled back to the pyrolysis reactor vapor quench mixer to be used as quench liquid for the pyrolytic reactor vapor. The remaining portion may be recovered as a product, with a provision to inject antioxidant into this stream.

The columns reboiler duty may be provided by circulating hot thermal fluid in a reboiler (not shown). A heavy pyrolysis cut product 76 from the columns bottom, which is a mixture of heavy hydrocarbons, may be pumped then combined with heavy pyrolysis cut from the pre flash drum and cooled by a heavy pyrolysis cut cooler (not shown) prior to being sent to storage.

As noted above, a portion 76B of the heavy pyrolysis cut product 76, and/or a portion 76B of the medium pyrolysis cut 74 may be recycled back to the melt tank or suitable location at the melt section and mixed with the molten plastic recovered from the melt tank 40.

The pyrolysis gas 78, or a portion thereof, may be used to fire burners in the hot thermal fluid heating system (not shown) and the pyrolysis reactor burners (not shown). However, the raw pyrolysis gas may contain olefins and diolefins. In some embodiments, the raw pyrolysis gas can be refrigerated and then fractionated to recover all compounds heavier than C2s or C3s. In other embodiments, the entire raw pyrolysis gas product stream 78 may be compressed and recovered as a product.

As noted above, the systems according to embodiments herein may be modular. In some embodiments, the system may be constructed to include three or more modules, such as including (1) the melt tank and associated equipment, (2) the pyrolysis reactor and associated equipment; and (3) the separation section and associated equipment. Other various storage tanks, compressors, thermal fluid heating systems, and other portions of the system may also be contained in one or more additional modules. The modules may also designed to be anchor bolted onto foundations. Further, the modules may also be provided with suitable connection points for utilities such as electrical power, cooling water, natural gas, feedstock introduction, products, etc.

Figure 3:
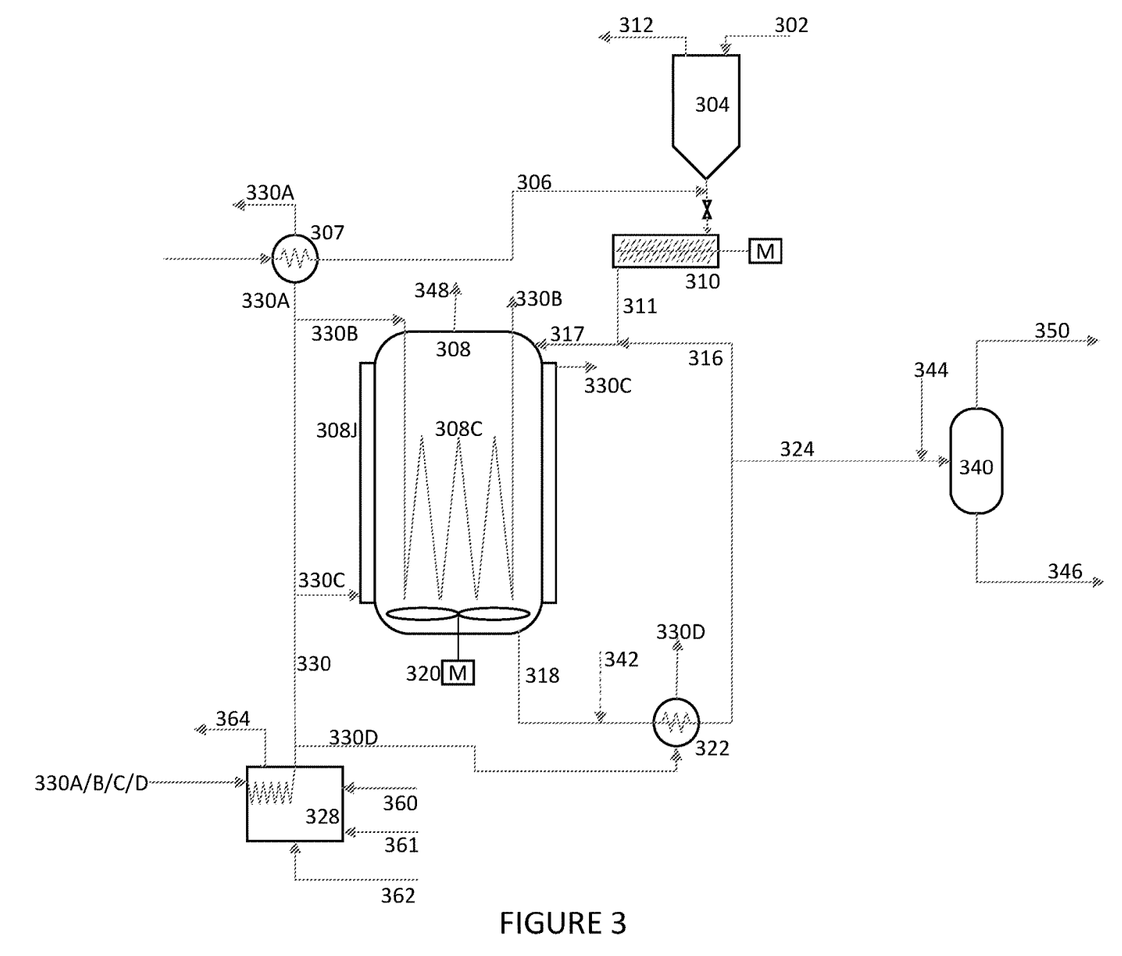
FIG. 3 illustrates a simplified process flow diagram of systems according to one or more embodiments disclosed herein.

Referring now to FIG. 3, a simplified process flow diagram of the feed system, melt tank, and vent gas separator according to embodiments herein is illustrated. Waste plastic 302, such as a shredded plastic (chips, chunks, pellets, small fibers, or as may be provided in other easily flowable forms), may be fed to a feed hopper 304. A small continuous stream of heated nitrogen 306 is fed to the feed hopper 304 to remove moisture coming with the feed waste plastic and to also prevent oxygen (air) ingress into the melt tank 308. For example, the nitrogen feed may be heated in a nitrogen heater 307 to a temperature, such as greater than 60° C. or greater than 100° C., using a hot thermal fluid 330A. A wet nitrogen stream 312 is vented from the feed hopper 304, which may be vented to the atmosphere in some embodiments. The dried waste plastic is then directed to the melt tank 308 through a feedstock auger 310, which may be used to meter the shredded plastic via flow line 311 into the melt tank at a desired rate.

Prior to being fed to the melt tank 308, the shredded plastic 311 is combined with a portion 316 of recycled molten plastic, which may be a portion of the plastic melted in and recovered from the bottom of the melt tank 308 via flow line 318. The combined plastic feed 317 is then heated within the melt tank 308 to a temperature sufficient to melt the waste plastic, such as a temperature in the range of 250° C. to 350° C., for example 300° C., where the molten plastic is sufficiently fluid (of low enough viscosity) for withdrawal via flow line 318 and transport to downstream equipment.

The melt tank 308 may be brought up to temperature by the use of hot thermal fluid 330, from the thermal fluid package 328. As illustrated in FIG. 3, the melt tank may be brought up to temperature by circulating a portion 330C of the hot thermal fluid through the exterior melt tank jacket 308J, as well as circulating a portion 330B of the hot thermal fluid through the internal heating coils 308C. Use of the thermal fluid 330 limits the maximum skin temperature at any point in the melt tank, which may aid in minimizing or nullifying any coke formation in the melt tank 308. The molten plastic is mixed within the melt tank 308 by the internal melt tank agitator 320.

The molten plastic withdrawn from the melt tank via flow line 318 is then further heated in a melt heat exchanger 322 against hot thermal fluid 330D, such as to a temperature in the range of 325° C. to 375° C., for example 350° C. The resulting heated polymer melt may be divided, as noted above, into portion 316 recycled to the melt tank 308 and polymer melt portion 324, which may be fed to downstream the melt vapor separator 340 and downstream processing (not illustrated), including the pyrolysis reactor for converting the waste polymer melt into lighter hydrocarbons.

In some embodiments, a solvent, such as a heavy oil or a medium or heavy cut of the pyrolysis oil produced in the downstream pyrolysis reactor, may be fed via flow line 342 and mixed with the molten polymer 318 withdrawn from the melt tank 308. The recycled pyrolysis oil may aid in melting the plastic, which is the first step towards successful pyrolysis in the reactor. Plastic is a non-Newtonian liquid and highly viscous. It is very difficult to heat the plastic in a tank and keep it homogeneous. The viscosity of plastic varies greatly with the molecular weight of the plastic polymer, the shear rate due to the agitator and other mechanical stress and with the temperature. In order to limit the wide variation of plastic rheology at or below the desired melt temperature, a suitable solvent 342 can be mixed with the molten plastic in the melt tank 308. The solvent 342 can come from any of the liquid products from the pyrolysis process (in house solvent) or from an external source. In some embodiments, the solvent is provided at a flow rate between 10-30% (by weight) of the fresh waste plastic 311 feed rate. As a further advantage, with use of the solvent, the plastic viscosity is reduced and heat transfer in the melt tank is improved.

As noted above, the polymer melt is heated in exchanger 322 prior to entering the melt vapor separator 340. Feed temperature to the melt vapor separator 340 is set by controlling the amount of hot thermal fluid to the melt heat exchanger 322, which may be a spiral-type heat exchanger.

Depending upon the polymers being processed, lime 344 may be injected as a slurry phase into the melt vapor separator 340 to remove inorganic and organic chloride from the molten plastic feed. Calcium oxide will react with chlorides inside the reactor to form calcium chloride which will then get removed from the reactor with the pitch. The molten plastic recovered via flow line 346 from the bottom of the separator 340 is then directed to the pyrolysis reactor (not shown) where it is heated, pyrolyzed, and processed as described above with respect to FIGS. 1 and 2.

Vent gases 348 from the melt tank and vent gases 350 from the melt vapor separator may be combined and directed to a vent gas cooler (not illustrated). Cooled vent gas may be sent to a wax oil separator (not shown). Any condensed hydrocarbon/wax oil is separated from the cooled vent gases in the wax oil separator drum. Liquid hydrocarbon/wax oil may be routed to the separation column downstream of the pyrolysis reactor to recover the hydrocarbons. Chloride present in the combined vent gas stream may be removed via water washing before combining with the overhead vapor from the separation column downstream of the pyrolysis reactor. Lime added to the reactor also removes difficult to remove organic chloride, thereby creating a very low ppm level chloride in the pyrolysis product.

Lime or other alkaline injection into the reactor may be used for meeting the chloride specification of products. Chlorides coming in with the feed, such as from PVC, are both organic and inorganic chlorides. While a part of inorganic and organic chloride which gets dissociated at melt tank condition gets removed with the melt tank vapor, the other more difficult to remove chloride reacts with the alkaline reagent, such as CaO (lime), in the pyrolysis reactor to form salts, such as calcium chloride ($CaCl_2$). The resulting salts and unreacted alkaline reagent, such as $CaCl_2$ and any unreacted CaO, gets removed with the pitch from the bottom of the pyrolysis reactor. In some embodiments, anhydrous lime powder is mixed with pyrolysis oil, such as a heavy cut product, and the resulting lime slurry is pumped into the pyrolysis reactor via flow line 344. Lime (alkaline reagent) dosing rates can be adjusted to get the desired reduction in chlorine in the pyrolysis products.

As described above, a thermal fluid package 328 may be used to supply heated thermal fluid to each of the nitrogen heater 307, the melt tank coils 308C, the melt tank jacket 308J, and the melt heat exchanger 322. Following heat exchange in the respective units, the thermal fluid may be returned to the thermal fluid package for re-heating and reuse in the heat exchange loops. The thermal fluid package 328 may be a fired heat exchanger, for example, which may be fueled by one or more fuels, which in some embodiments may be a light hydrocarbon fraction 360 recovered from the separation column downstream of the pyrolysis reactor, or an external fuel supply 361. The fuel may be combusted with air 362, producing exhaust 364. The fired heat exchanger used to heat the thermal fluid may be a stand-alone unit or may be configured as part of a larger fired heater used to heat multiple process or utility streams for the complex. In other embodiments, the thermal fluid may be heated by an electric heater.

In some embodiments, the overall pyrolysis unit is designed to consume a portion of the pyrolysis gas product within the unit itself once it has reached normal operating conditions. This pyrolysis gas will be used to fire burners in the hot thermal fluid heating system 328 and the pyrolysis reactor burners. However, depending upon the overall processing, the raw pyrolysis gas may contain olefins and diolefins, and may result in a flame profile that may be of environmental concern. As an option, the raw pyrolysis gas can be purified by refrigeration and fractionation to recover all compounds heavier than C1, C2s, or C3s. A further option is to compress the entire raw pyrolysis gas product stream (such as to approximately 27 barg) and then ship the compressed stream as a product. The heating requirements for the pyrolysis skid are then entirely met using imported natural gas.

As described above, embodiments herein are directed toward processes and systems for the conversion of waste polymeric materials to useful petrochemicals, fuels, and other intermediates and products. Advantageously, embodiments herein produce a pitch product, rather than tar or coke, and operate at temperatures and conversions allowing for production of a high quality pyrolysis oil.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent is:

1. A process for converting waste plastics, comprising:
feeding a waste plastic to a melt tank;
in the melt tank, heating the waste plastic to form a heated molten plastic;
withdrawing the heated molten plastic from the melt tank and feeding the heated molten plastic to a pyrolysis reactor;
in the pyrolysis reactor, heating the heated molten plastic to a pyrolysis temperature, producing a pyrolysis oil product and a liquid pitch product; and
separating the pyrolysis oil product into a pyrolysis gas fraction, a light pyrolysis oil fraction, a medium pyrolysis oil fraction, and a heavy pyrolysis oil fraction;
dividing the medium pyrolysis oil fraction into a first portion and a second portion; and
mixing the first portion of the medium pyrolysis oil with the heated molten plastic, wherein the mixing is performed downstream of the melt tank and upstream of the pyrolysis reactor.

2. The process of claim 1, wherein the waste plastic is provided to the melt tank as a partially or fully melted waste plastic recovered from an extruder, the process further comprising partially or fully melting the waste plastic in the extruder.

3. The process of claim 1, further comprising controlling a temperature in the pyrolysis reactor to limit a temperature of the heated molten plastic to a temperature below that at which char or coke will form.

4. The process of claim 1, further comprising:
dividing the heated molten plastic into a first portion and a second portion;
mixing the second portion with the waste plastic upstream of the melt tank; and
feeding the first portion to the pyrolysis reactor.

5. The process of claim 1, further comprising, prior to feeding the waste plastic to the melt tank, contacting the waste plastic with nitrogen at a temperature sufficient to remove water from the waste plastic.

6. The process of claim 1, further comprising:
dividing the medium pyrolysis oil fraction into a third portion;
passing the third portion of the medium pyrolysis oil through a cooler to form a cooled third fraction; and
quenching the pyrolysis oil recovered from the pyrolysis reactor with the cooled third portion of the medium pyrolysis oil.

7. The process of claim 1, further comprising providing heat to one or both of the melt tank or the pyrolysis reactor directly or indirectly via combustion of the pyrolysis gas fraction.

8. The process of claim 1, further comprising mixing an alkaline reagent with the heated molten plastic, downstream of the melt tank and upstream of the pyrolysis reactor, reacting the alkaline reagent with chlorine contained in the heated molten plastic to form calcium salts, and recovering the calcium salts with the liquid pitch product.

9. The process of claim 1, further comprising withdrawing a vapor stream from the melt tank, and optionally treating the vapor stream to remove any halogens contained therein.

10. A process for converting waste plastics, comprising:
feeding a waste plastic to a melt tank;
in the melt tank, heating the waste plastic to form a heated molten plastic;
withdrawing the heated molten plastic from the melt tank and feeding the heated molten plastic to a pyrolysis reactor;
in the pyrolysis reactor, heating the heated molten plastic to a pyrolysis temperature, producing a pyrolysis oil product and a liquid pitch product; and
separating the pyrolysis oil product into a pyrolysis gas fraction, a light pyrolysis oil fraction, a medium pyrolysis oil fraction, and a heavy pyrolysis oil fraction;
dividing the heavy pyrolysis oil fraction into a first portion and a second portion; and
mixing the first portion of the heavy pyrolysis oil with the heated molten plastic, wherein the mixing is performed downstream of the melt tank and upstream of the pyrolysis reactor.

11. The process of claim 10, wherein the waste plastic is provided to the melt tank as a partially or fully melted waste plastic recovered from an extruder, the process further comprising partially or fully melting the waste plastic in the extruder.

12. The process of claim 10, further comprising controlling a temperature in the pyrolysis reactor to limit a temperature of the heated molten plastic to a temperature below that at which char or coke will form.

13. The process of claim 10, further comprising:
dividing the heated molten plastic into a first portion and a second portion;
mixing the second portion with the waste plastic upstream of the melt tank; and
feeding the first portion to the pyrolysis reactor.

14. The process of claim 10, further comprising, prior to feeding the waste plastic to the melt tank, contacting the waste plastic with nitrogen at a temperature sufficient to remove water from the waste plastic.

15. The process of claim 10, further comprising:
dividing the medium pyrolysis oil fraction into a first portion and a second portion;
passing the second fraction of medium pyrolysis oil through a cooler to form a cooled second fraction; and
quenching the pyrolysis oil recovered from the pyrolysis reactor with the cooled second portion of the medium pyrolysis oil.

16. The process of claim 10, further comprising providing heat to one or both of the melt tank or the pyrolysis reactor directly or indirectly via combustion of the pyrolysis gas fraction.

17. The process of claim 10, further comprising mixing an alkaline reagent with the heated molten plastic, downstream of the melt tank and upstream of the pyrolysis reactor, reacting the alkaline reagent with chlorine contained in the heated molten plastic to form calcium salts, and recovering the calcium salts with the liquid pitch product.

18. The process of claim 10, further comprising withdrawing a vapor stream from the melt tank, and optionally treating the vapor stream to remove any halogens contained therein.

* * * * *